United States Patent Office.

THOMAS H. JACOBS AND JAMES Y. LOCKWOOD, OF ST. LOUIS, MISSOURI.

MAIZE OIL-CAKE.

SPECIFICATION forming part of Letters Patent No. 344,275, dated June 22, 1886.

Application filed June 8, 1885. Serial No. 168,098. (Specimens.)

*To all whom it may concern:*

Be it known that we, THOMAS H. JACOBS and JAMES Y. LOCKWOOD, residents of St. Louis, Missouri, have jointly made a new and useful Maize Oil-Cake, of which the following is a full, clear, and exact description.

This improved oil-cake is prepared from Indian corn or maize, and it may be termed "maize oil-cake."

From the kernels of Indian corn or maize separate what is termed the "germs" of the kernels. Then express the oil from these germs, and the remainder is the oil-cake in question. In treating the germs it is preferable to first reduce them to a mealy condition, in which condition they are heated, and then subjected to a heavy pressure, such as a hydraulic pressure, as in making linseed oil-cake. The germs are separated, preferably, by the reduction process.

We claim—

1. As a new article of commerce, the herein-described maize oil-cake, composed of the germs of corn or maize reduced to a mealy condition and pressed together.

2. The within-described process of preparing oil-cake, consisting in separating the germs from the kernel of corn or maize, reducing it to a mealy condition, heating the same, and then subjecting the same to hydraulic pressure, substantially as described.

Witness our hands.

THOMAS H. JACOBS.
JAMES Y. LOCKWOOD.

Witnesses:
C. D. MOODY,
J. W. HOKE.